(12) United States Patent  (10) Patent No.: US 9,189,699 B2
Liu et al.  (45) Date of Patent: Nov. 17, 2015

(54) AUGMENTED REALITY INTERACTION IMPLEMENTATION METHOD AND SYSTEM

(71) Applicant: Tencent Technology (Shenzhen) Company Limited, Shenzhen (CN)

(72) Inventors: Xiao Liu, Shenzhen (CN); Hailong Liu, Shenzhen (CN); Jie Hou, Shenzhen (CN); Feng Rao, Shenzhen (CN); Minhui Wu, Shenzhen (CN); Bo Chen, Shenzhen (CN)

(73) Assignee: Tencent Technology (Shenzhen) Company Limited, Shanzhen (CN)

(*) Notice: Subject to any disclaimer, the term of this patent is extended or adjusted under 35 U.S.C. 154(b) by 0 days.

(21) Appl. No.: 14/403,115

(22) PCT Filed: May 17, 2013

(86) PCT No.: PCT/CN2013/075784
§ 371 (c)(1),
(2) Date: Nov. 21, 2014

(87) PCT Pub. No.: WO2013/174231
PCT Pub. Date: Nov. 28, 2013

(65) Prior Publication Data
US 2015/0139552 A1   May 21, 2015

(30) Foreign Application Priority Data
May 22, 2012  (CN) .......................... 2012 1 0160524

(51) Int. Cl.
*G06K 9/46* (2006.01)
*G06K 9/66* (2006.01)
*G06T 11/00* (2006.01)
(Continued)

(52) U.S. Cl.
CPC .............. *G06K 9/46* (2013.01); *G06K 9/00671* (2013.01); *G06K 9/6202* (2013.01); *G06T 11/00* (2013.01)

(58) Field of Classification Search
CPC ... G06T 11/00; G06K 9/00671; G06K 9/6202
See application file for complete search history.

(56) References Cited
U.S. PATENT DOCUMENTS 6,522,312 B2 * 2/2003 Ohshima et al. .................. 345/8
8,619,160 B2 * 12/2013 Woo et al. ..................... 348/239
(Continued)

FOREIGN PATENT DOCUMENTS

CN  101551732  10/2009
CN  102129708   7/2011
(Continued)

OTHER PUBLICATIONS

International Search Report for PCT International Application No. PCT/CN2013/075784, mailed Aug. 29, 2013.
(Continued)

*Primary Examiner* — Gregory M Desire
(74) *Attorney, Agent, or Firm* — Blakely Sokoloff Taylor & Zafman LLP

(57) ABSTRACT

The present disclosure provides a method and system for realizing interaction in augmented reality. The method includes: collecting a frame image and uploads the frame image; recognizing a template image that matches the frame image and returning the template image; detecting a marker area of the frame image according to the template image; and superposing media data corresponding to the template image on the marker area and displaying the superposed image.

17 Claims, 7 Drawing Sheets

(51) Int. Cl.
*G06K 9/00* (2006.01)
*G06K 9/62* (2006.01)

(56) References Cited

U.S. PATENT DOCUMENTS

| | | | |
|---|---|---|---|
| 8,681,179 B2 * | 3/2014 | Rolleston et al. | 345/633 |
| 2012/0020648 A1 * | 1/2012 | Yamaji | 386/278 |

FOREIGN PATENT DOCUMENTS

| | | |
|---|---|---|
| CN | 102156808 | 8/2011 |
| CN | 102332095 | 1/2013 |

OTHER PUBLICATIONS

Written Opinion of the International Search Authority for PCT International Application No. PCT/CN2013/075784, mailed Aug. 29, 2013, 12 pages.

* cited by examiner

AUGMENTED REALITY INTERACTION IMPLEMENTATION METHOD AND SYSTEM

CROSS-REFERENCE TO RELATED APPLICATION

This application is the U.S. National Phase application of PCT International Application No. PCT/CN2013/075784, filed May 17, 2013, and claims priority of Chinese Patent Application No. 201210160524.8, filed May 22, 2012, the entire disclosures of both of which are incorporated herein by reference.

TECHNICAL FIELD

The present disclosure relates to simulation technologies, and especially to a method and system for realizing interaction in augmented reality.

BACKGROUND

An augmented reality technology is a simulation technology of applying virtual information to the real world, and superposes an image of a real environment and a virtual environment in a same frame in real time. All kinds of applications that use the augmented reality technology can make a user fitted into a virtual environment. A traditional interaction process in the augmented reality technology can be realized by all kinds of clients running on terminal devices.

For example, take a poster as a marker. An image of the marker is captured by using a camera and is used for recognition to get a recognition result. According to the recognition result, a movie trailer related to the content of this specific poster is got and is played. Since logic involved for recognition during the interaction process of the augmented reality technology is very complex and includes all kinds of files, which results in that the size of a client is over large, so in interaction applications of the augmented reality technology realized by all kinds of clients, each kind of interaction application can only correspond to a single marker and is realized by a corresponding client. In another word, each client can only correspond to a kind of marker, and for different markers, corresponding clients need to be developed specifically, and a single client is unable to realize the interaction process of the augmented reality technology for multiple kinds of markers, which results in that a user has to download and install multiple clients repeatedly and lacks of flexibility.

Furthermore, traditional interaction in the augmented reality technology may also be realized by a mainframe computer connected to a big screen set up indoors or outdoors. For example, when a shampoo commercial is being played on an outdoor big screen, if a viewer stands in a certain area before the big screen, a video of the viewer learning dance with a virtual famous people or taking a picture with the famous people will be played on the big screen; as another example, when an indoor big screen commercial is launched in a museum, if a viewer stands in a specified area, he may see a video of dinosaurs or astronauts passing by him on the indoor big screen. Though compared to a client running on a terminal device, a mainframe computer connected to an indoor or outdoor big screen has relatively strong backstage calculation abilities and can process complex logic in the interaction process of the augmented reality technologies, the interaction in the augmented reality technology realized by a big screen and a mainframe connected thereto, due to limitations of its use, also aims to a single marker and lacks of flexibility.

SUMMARY

Based on this, a method for realizing interaction in augmented reality with improved flexibility is provided.

Further, it is necessary to provide a system for realizing interaction in augmented reality with improved flexibility.

The method for realizing interaction in augmented reality includes the following steps: collecting a frame image and uploads the frame image; recognizing a template image that matches the frame image and returning the template image; detecting a marker area of the frame image according to the template image; and superposing media data corresponding to the template image on the marker area and displaying the superposed image.

The system for realizing interaction in augmented reality, wherein it includes a client and a server; wherein the client includes a collection module, a detection module and a display processing module; the collection module is adapted to collect a frame image and uploads the frame image; the server is adapted to recognize a template image that matches the frame image and return the template image; the detection module is adapted to detect a marker area of the frame image according to the template image; and the display module is adapted to superpose media data corresponding to the template image on the marker area and display the superposed image.

The method and system for realizing interaction in augmented reality, uploads the frame image after the frame image is collected, performs recognition according to the uploaded frame image and returns the template image matching it, detects the marker area of the frame image according to the returned template image, further superposes the media data on the marker area, displays the superposed image, and uploads the frame image to a remote server to perform the recognition and matching with the template image, so that the relatively complex recognition process is not necessary to be completed locally, further largely improves the recognition ability in the interaction in augmented reality, and for all kinds of markers, it can all recognize template images matching them, which largely improves the flexibility.

DETAILED DESCRIPTION

Figure 1:
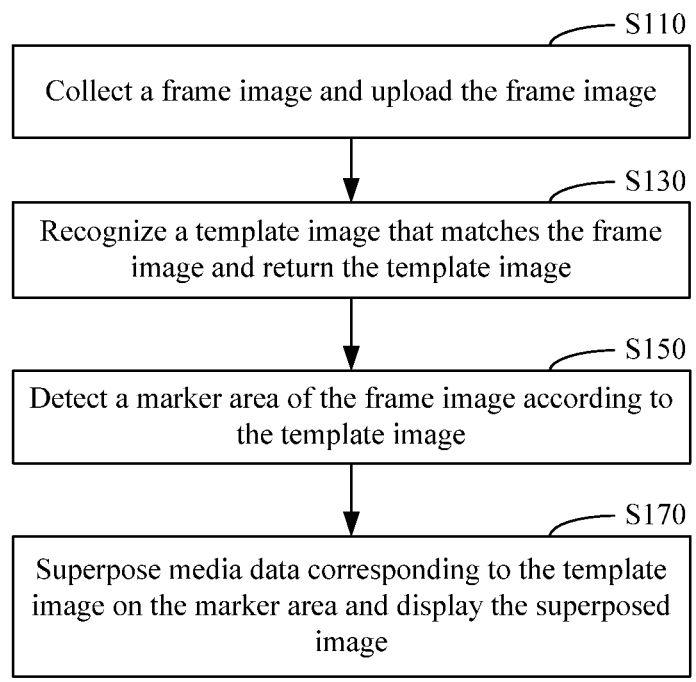
FIG. 1 shows a flow chart of a method for realizing interaction in augmented reality according to an example.

As shown in FIG. 1, in an example, a method for realizing interaction in augmented reality includes the following process.

At block S110, a frame image is collected and uploaded.

In the present example, the frame image is obtained by image collection. The frame image can be in the two-dimension (2D) format or three-dimension (3D) format, and is a certain image of an image sequence corresponding to a video stream obtained during the image collection process. For example, the image collection is continuously performed to obtain the video stream. The video stream is formed of the image sequence, that is to say, the image sequence includes several frame images. The frame image collected and uploaded to the server is an image currently collected from the image sequence.

At block S130, a template image matching the frame image is recognized and the template image is returned.

In the present example, several different template images are stored in advance, and the template image matching the uploaded frame image is recognized from the template images stored in advance. The template image may be recognized according to the frame image by using recognition algorithms such as SIFT (Scale-Invariant Feature Transformation) based pattern recognition algorithms, etc. For example, if the frame image is an image of a poster of the movie XX, while the template images stored in advance contain several hundreds of movie posters, at the moment, the image of the poster of the movie XX can be got from the stored template images by recognizing the stored template images, and the recognized image of the poster is the template image that matches the frame image. After the template image matching the frame image is recognized and obtained, the server returns the recognized template image to a client which uploaded the frame image.

At block S150, a marker area of the frame image is detected according to the template image.

In the present example, during the image collection process, a marker object is shot to get a frame image of the marker object, while an area that the marker object forms in the frame image is the marker area. The template image is used to detect the marker area in the frame image, and an image of the marker object also exists in the template image. During the process of detecting the marker area of the frame image, the marker area of the frame image can be obtained by comparing the template image and the frame image, further, points in the template image that form the marker area can also be recorded in advance, and further the marker area in the frame image can be obtained rapidly according to the recorded points.

At block S170, media data corresponding to the template image is superposed on the marker area and the superposed image is displayed.

In the present example, the media data corresponds to the template image and can be a video stream or a 3D video model. For example, if the template image is a poster of a movie, then the media data is a playing file of the movie. The media data is superposed on the marker area, and during display of the superposed image, playing the media data constitutes a virtual environment, while a series of frame images with the marker area thereof being removed constitute a real environment, and an effect of augmented reality is realized.

Figure 2:
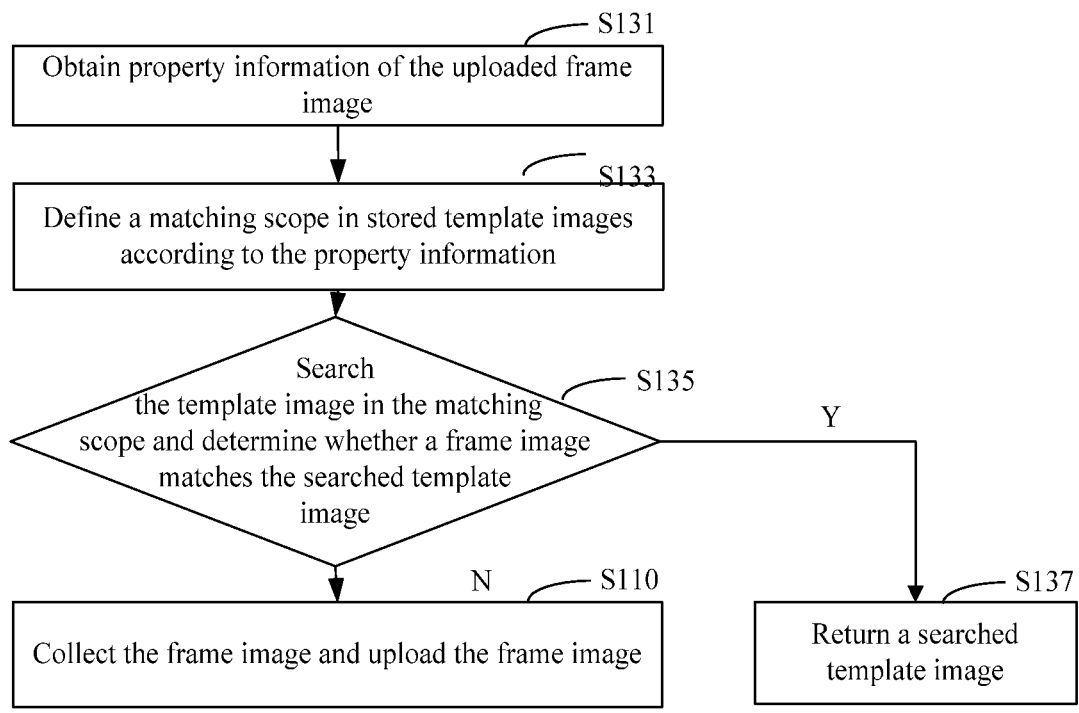
FIG. 2 shows a flow chart of the method for recognizing a template image matching a frame image and returning the template image in FIG. 1.

As shown in FIG. 2, in an example, a detailed process of the above block S130 includes the following process.

At block S131, property information of the uploaded frame image is obtained.

In the present example, the property information of the uploaded frame image is used to record description information related to the frame image. In an example, the property information includes user information and device information, in which the user information is personal identity information registered by the user, e.g., gender, age, education background, hobbies, etc.; the device information is information returned by a hardware device used when the user uploaded the frame image. For example, assuming that a user used a mobile terminal to upload the frame image to the server, then the device information includes GPS geographical information, a device manufacturer and a network environment, etc.

At block S133, a matching scope is defined in the stored template images according to the property information.

In the present example, a scope is defined in the multiple stored template images based on the property information. For example, if the property information records that the user who uploads the frame image is female and the GPS geographical information is Beijing, then the defined matching scope is template images related to the female and Beijing. Specifically, assuming that in the stored template images, there are cosmetics commercial images, shaver commercial images, Beijing concert images and Shanghai concert images, then the template images in the matching scope are cosmetics commercial images and Beijing concert images. Defining the matching scope facilitates to rapidly get a template image that matches the frame image and improves the accuracy of matching.

At block S135, the template images in the matching scope are searched, and it is determined whether a searched template image matches the frame image, and if it does, then block S137 is entered, or otherwise, block S110 is returned to.

In the present example, the template images in the matching scope are searched one by one so as to obtain the template image matching the frame image and return the searched template image to the user who uploaded the frame image.

At block S137, the searched template image is returned.

Figure 3:
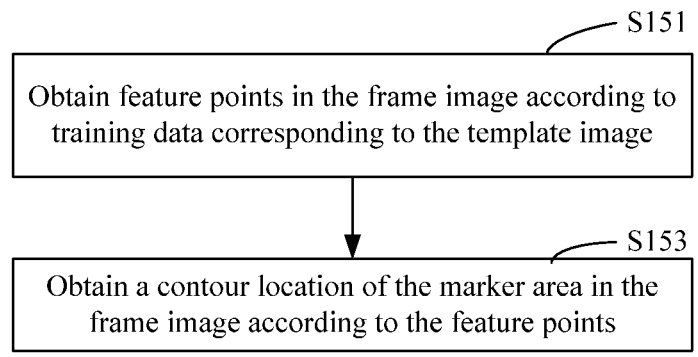
FIG. 3 shows a flow chart of the method for detecting a marker area of the frame image according to the template image in FIG. 1.

As shown in FIG. 3, in an example, a detailed process of the block S150 includes the following.

At block S151, feature points of the frame image are obtained according to training data corresponding to the template image.

In the present example, the training data is feature points used to record the marker area of the template image and the marker area of the template image can be marked by a series of feature points. Since the template image matches the frame image, the feature points used to mark the marker area in the frame image are obtained by the feature points recorded in the training data. That is, the feature points recorded in the training data and the feature points in the frame image are feature point pairs that match each other.

At block S153, a contour location of the marker area in the frame image is obtained via the feature points.

In the present example, the contour location of the marker area in the frame image is obtained by a series of feature points in the frame image, and further a contour of the marker area and its coordinates in the frame image are obtained by using the contour location.

The above process of obtaining the marker area is processed at the client. However it is not limited to this and can be processed at the server too.

Figure 4:
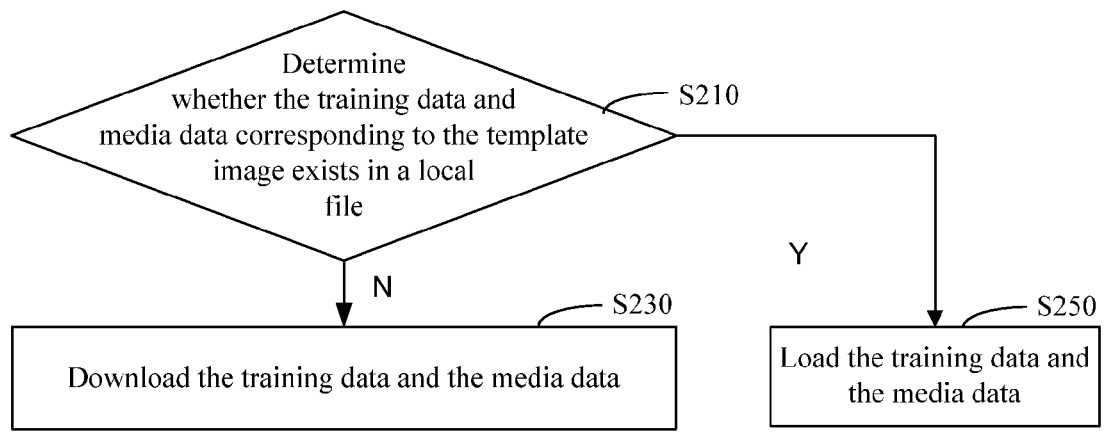
FIG. 4 shows a flow chart of a method for realizing interaction in augmented reality in another example.

As shown in FIG. 4, in another example, before the above block S150, it further includes the following.

At block S210, it is determined whether the training data and the media data corresponding to the template image exists in a local file, and if it does not, then block S230 is entered, and if it does, then block S250 is entered.

In the present example, the local file is a file stored locally at the client. After the marker area of the frame image is obtained, it is determined whether the training data and the media data corresponding to the template image exists locally at the client, and if it does not, then the training data and the media data needs to be downloaded from the server, and if the training data and the media data corresponding to the template image exists in the client locally, then it is loaded directly.

At block S230, the training data and the media data is downloaded.

In the present example, detection of the marker area and superposition and playing of the media data can be performed after the user has downloaded the training data and the media data, or the subsequent process can be performed along transmission during data transmission of the training data and the media data in streams.

At block S250, the training data and the media data is loaded.

Figure 5:
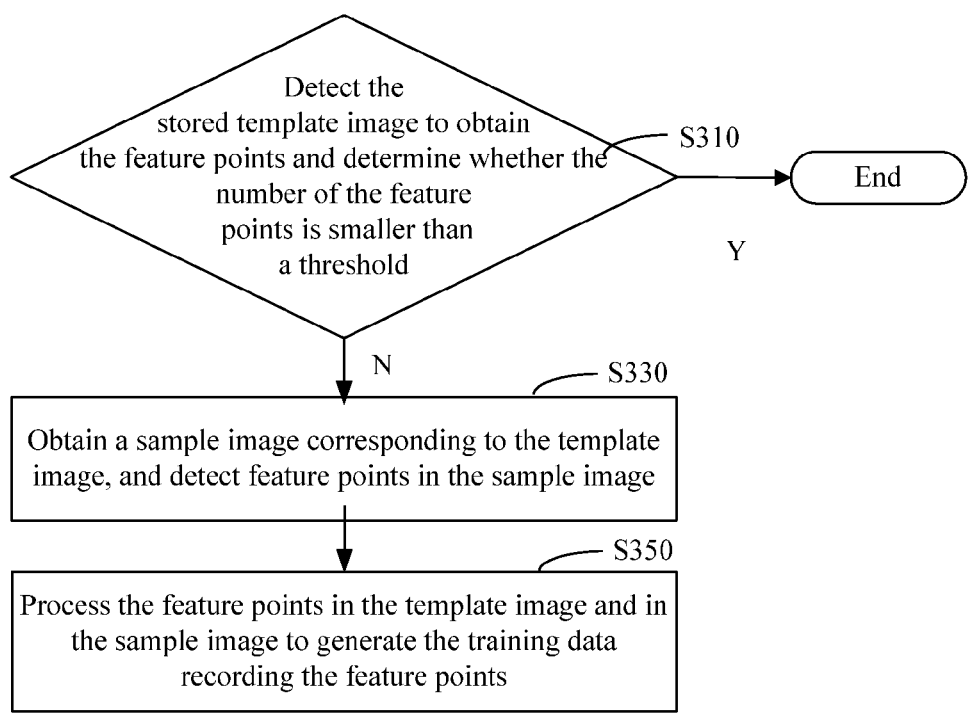
FIG. 5 shows a flow chart of a method for realizing interaction in augmented reality in another example.

As shown in FIG. 5, in another example, before the block S150, at block S310, the stored template image is detected to obtain the feature points, and it is determined whether the number of feature points is smaller than a threshold, and if it is not, then block S330 is entered, and if it is, then the process ends.

In the present example, during the detection of the marker area of the frame image according to the template image, the feature points in the frame image are obtained according to the feature points in the template image. The template image is an image collected and stored by the server and is uploaded and stored by the user. As for an image stored as the template image, there is no training data and media data corresponding to it in the data stored in the server, then at the moment, the template image needs to be trained to obtain the training data and a corresponding relation needs to be established between the template image and the media data. The training for the template image can be performed at the server or can be performed at the client; however, preferably, the training of the template image is realized at the server, which further realizes a lightweight client.

During the training of the template image, the image stored as the template image needs to be detected according to a feature point detection algorithm so as to get the feature points in the template image. The feature point detection algorithm can be a FAST feature point detection algorithm or a similar SURF feature point detection algorithm, and can also be other feature point detection algorithms, which will not be enumerated here.

After the feature points of the template image are obtained, it further needs to determine whether the number of the feature points is enough to detect the marker area of the frame image so as to guarantee the validity of template image. In a preferred example, a selected threshold is 100.

At block S330, sample images corresponding to the template image is obtained, and feature points in the sample image are detected.

In the present example, to guarantee the accuracy of detecting the feature points, several sample images corresponding to the template image are obtained for the feature point detection so as to guarantee the robustness of the feature points. The sample images are images corresponding to the template image and have different rotation angles and/or scaling sizes. For example, for 360°, a rotation angle is set every 10°, and 36 rotation angles are obtained; and each time a scaling size of 0.8 is reduced to get 7 scaling levels, and totally 36×7=252 sample images of different rotation angles and scaling sizes can be obtained, and the feature point detection is performed for every sample image.

At block S350, the feature points in the template image and the sample images are processed to generate the training data that records the feature points.

In the present example, the training data that records the feature points is formed by combining the feature points in the template image and in a sample image. Specifically, same feature points in the template image and in the sample image are combined to form a feature point, and the location of the feature point is recorded to get the training data.

In another example, the feature points are clipped to guarantee the accuracy of the feature points. In multiple sample images, the frequency that some feature points repeatedly appear is very low, then these feature points that relatively less reappear have a relatively high possibility of being generated due to detection by mistake, and may cause interference for subsequent detection of the marker area of the frame image, so these feature points should be clipped and excluded.

Specifically, the detailed process of combining and clipping feature points in the template image and the sample image is: adding random noises and performing obfuscation for the template image and the sample image, and then performing the feature point detection again for the images added with the noises and performed obfuscation for to get feature points accordingly; determining whether the feature points of the template image and the sample image exist in the feature points corresponding to the images added with the noises and the obfuscation, and if they do not, then clipping them, or otherwise, combining them.

If it is determined that the feature point of the template image and the sample image also exists in the feature points corresponding to the images added with the noises and the obfuscation, then it means that the feature point is reproducible, and if a certain feature point does not show up in the feature points corresponding to the images added with the noises and the obfuscation, then it will be deemed as being less reproducible.

Further, as for a feature point that is reproducible, it is further determined the number of reproduction times of the feature point, and if the number of reproduction times is larger than a reproduction threshold, then the feature point is recorded, or otherwise, the feature point is excluded so as to guarantee the accuracy of the feature points more efficiently.

The above process of generating the training data is realized at the server, however, it should not be limited to this and it can also be realized at the client.

Figure 6:
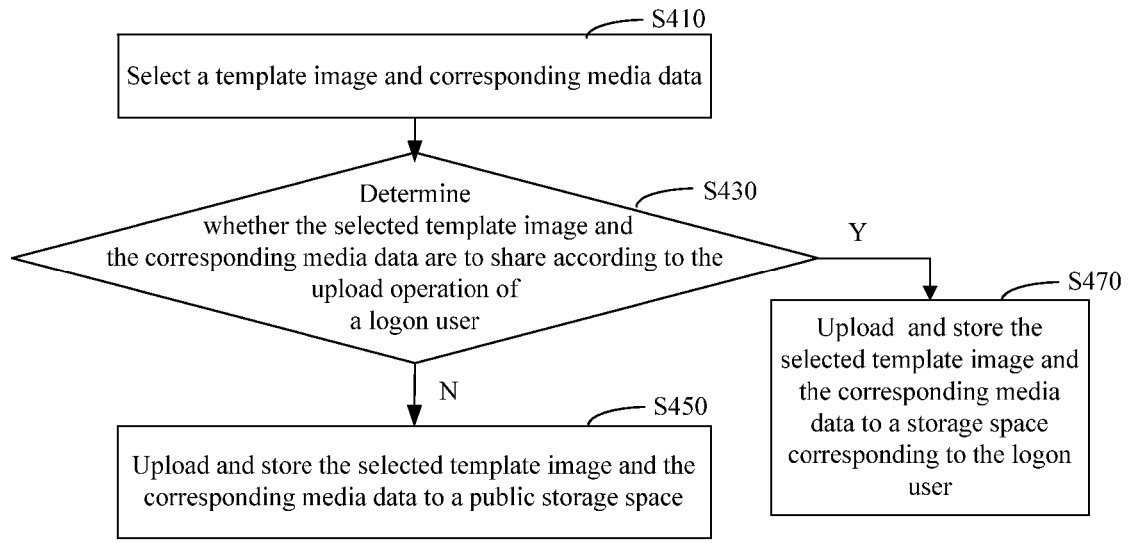
FIG. 6 shows a flow chart of a method for realizing interaction in augmented reality in another example.

As shown in FIG. 6, in another example, before the block S310, it further includes the following.

At block S410, the template image and corresponding media data is selected.

In the present example, as for the template images and the media data stored in advance, the user can select the template images and corresponding media data by him to realize personalized interaction in augmented reality. Specifically, a template image can be a picture taken by the user, or can be an image got in other ways; the media data can be a video stream shot by the user or a 3D video model, or can be got by the user editing a video stream or a 3D video model obtained from the internet, for example, the user can change background music in a downloaded video stream, and change it to his voice.

At block S430, it is determined whether the selected template image and the corresponding media data are shared according to an upload operation of a logon user, and if they are, then block S450 is entered, or otherwise, block S470 is entered.

In the present example, before the selected template image and the corresponding media data are uploaded, it further needs to validate the user information to enter into the logon status, at the time, the uploading operation of the logon user is obtained, the uploading operation including an uploading instruction and/or a sharing instruction triggered by the user, and the user can select whether to share according to his needs.

At block S450, the selected template image and the corresponding media data are uploaded and stored to a public storage space.

In the present example, if the selected template image and the corresponding media data are to be shared, then they are uploaded and stored to the public storage space, so that other users can also use the template image and the media data unloaded by the logon user.

At block S470, the template image and the corresponding media data are uploaded and stored to a storage space corresponding to the logon user.

In the present example, if the selected template image and the corresponding media data are not to share, then the uploaded template image and the corresponding media data are stored to the storage space corresponding to the logon user.

In an example, the priority of the storage space corresponding to the logon user is higher than the priority of the public storage space.

In the present example, the priority of the storage space corresponding to the logon user and the priority of the public storage space decide the priority of the template images stored therein. In another word, during the process of recognizing the template image that matches the frame image, if two template images matching the frame image are recognized and the two template images are respectively stored in the storage space corresponding to the logon user and the public storage space, then at the time, since the priority of the storage space corresponding to the logon user is higher than that of the public storage space, then the template image stored in the storage space corresponding to the logon user will be preferentially adopted and will be returned to the logon user.

Figure 7:
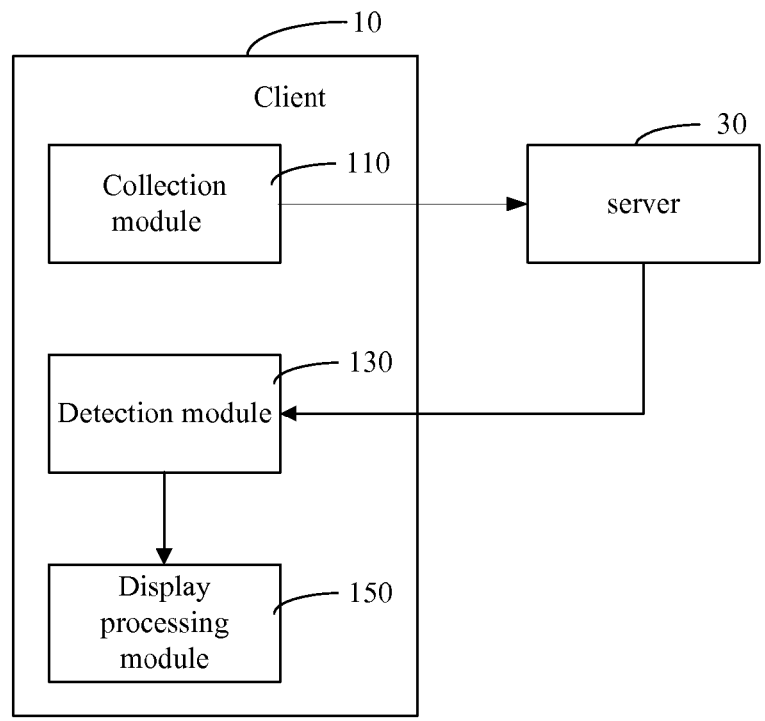
FIG. 7 is a structural schematic diagram of a system for realizing interaction in augmented reality in an example.

As shown in FIG. 7, in an example, a system for realizing interaction in augmented reality includes a client 10 and a server 30, in which the client 10 includes a collection module 110, a detection module 130 and a display processing module 150.

In an example, the client is installed in a terminal device, and it is divided into a computer client, a mobile client, and a web page client. The computer client is installed in a computer, the mobile client is installed in a mobile terminal and the web page client is realized based on a browser.

The collection module 110 is used to collect a frame image and upload the frame image.

In the example, the collection module 110 is used to perform image collection to get a frame image and the frame image can be in the 2D format or 3D format. The collection module 110 obtains a certain image of an image sequence corresponding to a video stream. For example, the collection module 110 continuously performs the image collection to obtain the video stream. The video stream is formed of the image sequence, that is to say, the image sequence includes several frame images. The frame image collected and uploaded to the server is the image currently collected from the image sequence. Specifically, the collection module 110 can be a camera in the terminal device.

The server 30 is used to recognize a template image matching the frame image, and return the template image.

In the present example, several different template images are stored in advance in the server 30, and the template image matching the uploaded frame image is recognized from the template images stored in advance. The template image may be recognized according to the frame image by using recognition algorithms such as SIFT (Scale-Invariant Feature Transformation) based pattern recognition algorithms, etc. For example, if the frame image is an image of a poster of the movie XX, while the template images stored in advance in the server 30 contain several hundreds of movie posters, at the moment, the image of the poster of the movie XX can be got from the stored template images by recognizing the stored template images, and the recognized image of the poster is the template image that matches the frame image. After the template image matching the frame image is recognized and obtained, the server 30 returns the recognized template image to a client 10 which uploaded the frame image.

The detection module 130 is used to detect a marked area of the frame image according to the template image.

In the present example, the collection module 10 shots a marker object to get a frame image of the marker object, and an area the marker object forms in the frame image is the marker area. The template image is used to detect the marker area in the frame image, and an image of the marker object also exists in it. During the process of detecting the marker area of the frame image, the marker area of the frame image can be obtained by comparing the template image and the frame image, in addition, points in the template image that forms the marker area can be recorded in advance, and further the marker area in the frame image can be rapidly obtained according to the recorded points.

The display processing module 150 is adapted to superpose media data corresponding to the template image on the marker area and display the superposed image.

In the present example, the media data corresponds to the template image and it can be a video stream or a 3D video model. For example, if the template image is a poster of a movie, then the media data is a playing file of the movie. The media data is superposed on the marker area, and during the process of displaying the superposed images, playing the media data constitutes a virtual environment, while a series of frame images with the marker area thereof being removed constitute a real environment, which realizes an effect of augmented reality.

Figure 8:
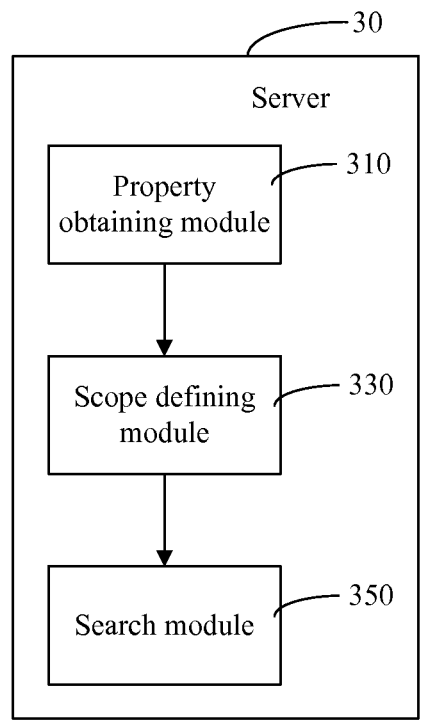
FIG. 8 is a structural schematic diagram of the server in FIG. 7.

As shown in FIG. 8, in an example, the above server 30 includes a property obtaining module 310, a scope defining module 330 and a searching module 350.

The property obtaining module 310 is used to obtain property information of the uploaded frame image.

In the present example, the property information of the uploaded frame image is used to record the description information related to the frame images. In an example, the property information includes user information and device information, in which the user information is personal identity information registered by the user, e.g., gender, age, education background and hobbies, etc.; the device information is information returned by a hardware device used when the user uploads frame image. For example, assuming that a user used a mobile terminal to upload the frame image to the server, then the device information includes GPS geographic information, a device manufacturer and a network environment, etc.

The scope defining module 330 is adapted to define a matching scope in the stored template images according to the property information.

In the example, the scope defining module 330 defines a scope in the stored multiple template images based on the property information. For example, if the property information records that the user who uploads the frame image is female and the GPS geographical information is Beijing, then the defined matching scope is template images related to the female and Beijing. Specifically, assuming that in the stored template images, there are cosmetics commercial images, shaver commercial images, Beijing concert images and Shanghai concert images, then the template images in the matching scope are cosmetics commercial images and Beijing concert images. Defining the matching scope facilitates to rapidly get a template image that matches the frame image and improves the accuracy of matching.

The searching module 350 is adapted to search template images in the matching scope, determine whether the frame image matches a searched template image, and if it does, then return the template image to the client 10, or otherwise, inform the collection module 110.

In the present example, the search module 350 searches the template images one by one in the matching scope to obtain a template image that matches the frame image and return a searched template image to the user who uploaded the frame image.

Figure 9:
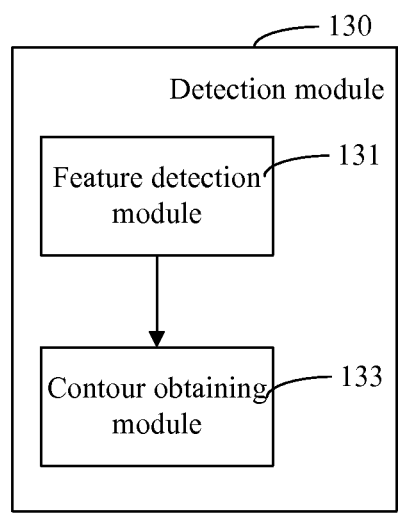
FIG. 9 is a structural schematic diagram of the detection module in FIG. 7.

As shown in FIG. 9, in an example, the detection module 130 includes a feature detection unit 131 and a contour obtaining unit 133.

The feature detection unit 131 is adapted to obtain the feature points in the frame image according to training data corresponding to the template image.

In the present example, the training data is feature points used to record the marker area of the template image and the marker area of the template image can be marked by a series of feature points. Since the template image matches the frame image, therefore, the feature detection unit 131 obtains the feature points that are used to mark the marker area in the frame image by using the feature points recorded in the training data. That is, the feature points recorded in the training data and the feature points in the frame image are feature point pairs that match each other.

The contour obtaining unit 133 is adapted to obtain a contour location of the marker area in the frame image via the feature points.

In the present example, the contour obtaining unit 133 obtains the contour location of the marker area in the frame image by a series of feature points in the frame image, and further to obtain a contour of the marker area and its coordinates in the frame image by using the contour location.

The detection module 130 can also be set in the server 30 instead of being set in the client 10.

Figure 10:
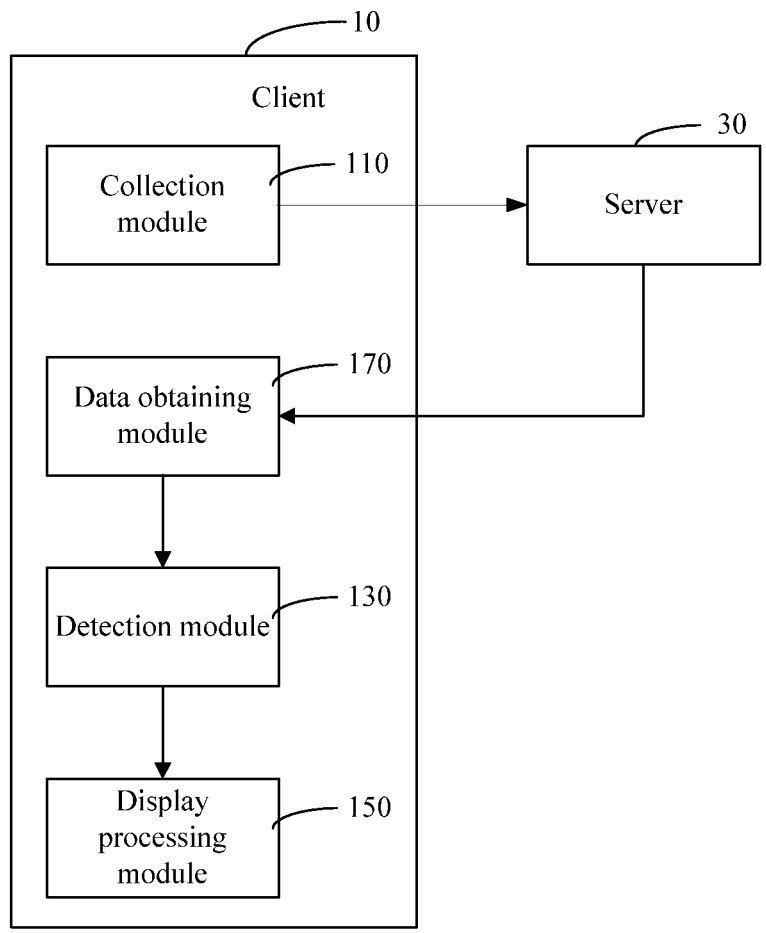
FIG. 10 is a structural schematic diagram of a client in an example.

As shown in FIG. 10, in another example, the above client 10 can also include a data obtaining module 170.

The data obtaining module 170 is adapted to determine whether the training data and the media data corresponding to the template image exists in a local file, and if it does not, then download the training data and the media data, or if it does, then load the training data and the media data.

In the present example, the local file is a file stored locally at the client. The data obtaining module 170 determines whether the training data and the media data corresponding to the template image exists locally at the client, and if it does not, then the data obtaining module 170 needs to download the training data and the media data, and if the training data and the media data corresponding to the template image exists in the client locally, then the data obtaining module 170 loads the training data and the media data directly.

The user can detect the marker area and superpose the media data and play the media data after the downloading is completed, and can also perform the subsequent process along transmission during data transmission of the training data and the media data in streams.

Figure 11:
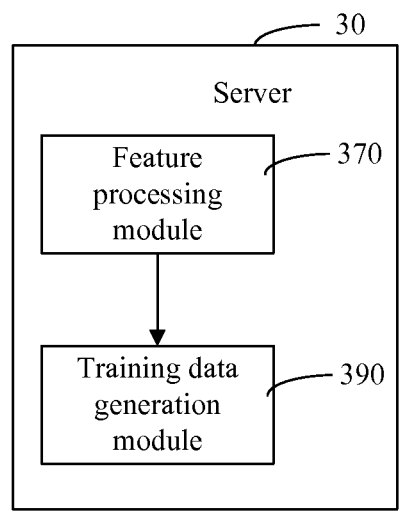
FIG. 11 is a structural schematic diagram of a server in another example.

As shown in FIG. 11, in another example, the above server 30 also includes a feature processing module 370 and a training data generation module 390.

The feature processing module 370 is adapted to detect the stored template image to obtain the feature points, and determine whether the number of feature points is smaller than a threshold, and if it is not, then obtain the sample image corresponding to the template image and detect the feature points of the sample image, and if it is, then the process ends.

In the present example, the feature processing module 370 obtains the feature points in the frame image by using the feature points in the template image. The template image is an image that the server collected and stored and the user uploaded and stored. As for an image stored as template image, there is no training data and media data corresponding to it in the data stored in the server, and then at the moment, the template image needs to be trained to obtain the training data and establish a corresponding relation between the template image and the media data. Training for the template image can be performed at the server and can also be performed at the client; however, preferably, the server is used to realize the training of the template image so as to further realize a lightweight client.

During the training of the template image, the feature processing module 370 needs to detect the image stored as the template image according to a feature point detection algorithm so as to get the feature points in the template image. The feature detection algorithm can be a FAST feature point detection algorithm or a similar SURF feature point detection algorithm, and can also be other feature point detection algorithms, which will not be enumerated herein.

The feature processing module 370 also needs to determine whether the number of the feature points is enough to detect the marker area of the frame image so as to guarantee the validity of the template image. In a preferred example, a selected threshold is 100.

The training data generation module 390 is adapted to process the feature points in the template image and the sample image to generate the training data recording the feature points.

In the present example, to guarantee the accuracy of detecting the feature points, the training data generation module 390 obtains several sample images corresponding to the template image to detect the feature points so as to further guarantee the robustness of the feature points. The sample images are images corresponding to the template image and have different rotation angles and/or scaling size. For example, for 360°, the training data generation module 390 sets a rotation angle every 10°, and totally 36 rotation angles are obtained; and each time a scaling size of 0.8 is reduced to get 7 scaling levels, and totally 36×7=252 sample images of different rotation angles and scaling sizes can be obtained, and the feature point detection is performed for every sample image.

In another example, the training data generation module 390 also clips the feature points so as to guarantee the accuracy of the feature points. In multiple sample images, the frequency that some feature points occur repeatedly is very low, and the feature points that relatively less reappear have a relatively high possibility of being generated due to detection by mistake, and may cause interference for subsequent detection of the marker area of the frame image, therefore, the training data generation module 390 should clip and exclude the feature points.

Specifically, the training data generation module 390 adds random noises and performs obfuscation for the template image and the sample image, then performs the feature point detection again for the images added with the noises and obfuscation, and obtains the corresponding feature points; determines whether the feature points of the template image and sample image exist in the feature points corresponding to the images added with the noises and the obfuscation, and if they do not, then clips them, or otherwise, combines them.

If the training data generation module 390 determines that the feature points of the template image and the sample image also exist in the feature points corresponding to the image added with the noises and the obfuscation, then it indicates that the feature point is reproducible, and if a certain feature point does not show up in the feature points corresponding to the images added with the noises and the obfuscation, then it will be deemed as being less reproducible.

Further, as for a feature point that is reproducible, the training data generation module 390 is also adapted to determine the number of reproduction times of the feature point, and if the number of reproduction times is larger than a reproduction threshold, then the feature point is recorded, or otherwise, the feature point will be excluded so as to guarantee the accuracy of the feature points more efficiently.

In another example, the above feature processing module 370 and the training data generation module 390 can also be set in the client 10, and after the training data is generated it is uploaded to the server 30.

In another example, the above client 10 is also adapted to select the template image and the corresponding media data.

In the present example, as for the template images and the media data stored in advance, the user can select the template images and corresponding media data by him to realize personalized interaction in augmented reality. Specifically, a template image can be a picture taken by the user, or can be an image got in other ways; the media data can be a video stream shot by the user or a 3D video model, or can also be got by the user editing a video stream or a 3D video model obtained from the internet, for example, the user can change background music in a downloaded video stream, and change it to his voice.

Figure 12:
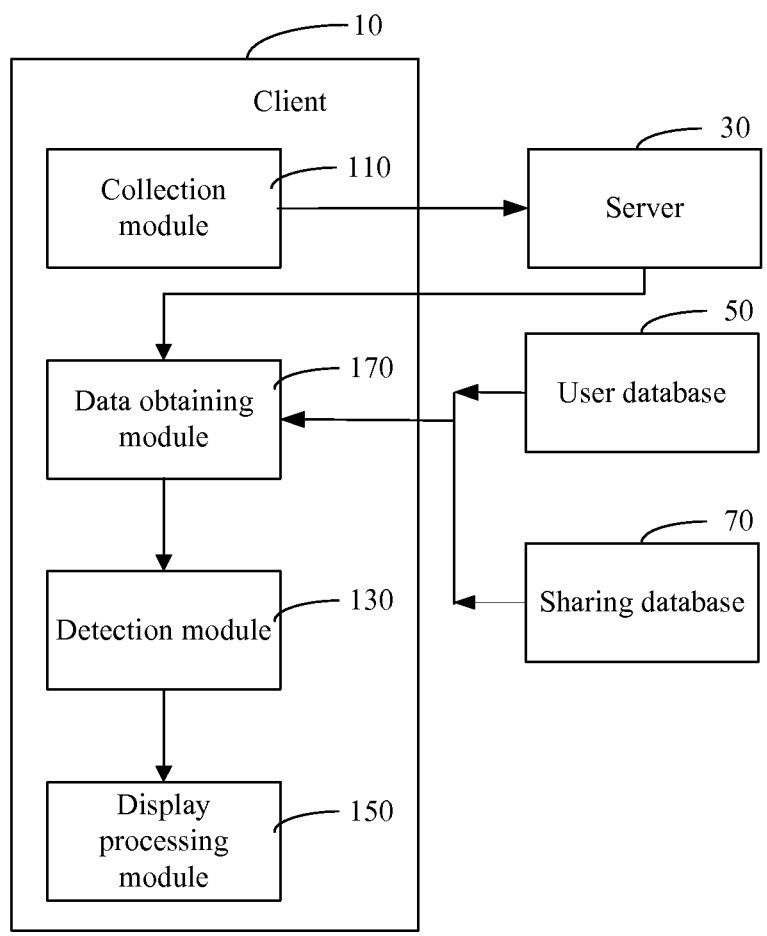
FIG. 12 is a structural schematic diagram of a system for realizing interaction in augmented reality in another example.

As shown in FIG. 12, the above system of realizing interaction in augmented reality also includes a user database 50 and a shared database 70.

The server 30 is also used to determine whether to share a selected template image and corresponding media data according to the uploading operation of the logon user, and if it is, then upload the selected template image and the corresponding media data and store them to the shared database 70, or otherwise, upload and store them to the user database 50 corresponding to the logon user.

In the present example, before the selected template image and the corresponding media data are uploaded, it further needs to validate the user information to enter into the logon status, at the moment, the server 30 obtains the uploading operation of the logon user, the uploading operation including an uploading instructions and/or a sharing instruction triggered by the user, and the user can select whether to share according to his needs.

If the selected template image and the corresponding media data are to share, then they are uploaded and stored to the sharing database 70, so that other users can also use the template image and the media data uploaded by the logon user.

If the selected template image and the corresponding media data are not to share, then the uploaded template image and the corresponding media data are stored to the user database 50 corresponding to the logon user.

In another example, the priority of the user database 50 is set to the priority of the sharing database 70.

In the present example, the priority of the user database 50 corresponding to the logon user and the priority of the sharing database 70 decide the priority of the template images stored therein. In another word, during process of recognizing the template image that matches the frame image, if the server 30 recognizes two template images matching the frame image, and the two template images are stored in the user database 50 corresponding to the logon user and the sharing database 70, then at the time, since the priority of the user database 50 corresponding to the logon user is higher than the priority of the sharing database, then the template image stored in the user database 50 corresponding to the logon user will be preferentially adopted and will be returned to the logon user.

The above method and system for realizing interaction in augmented reality, uploads the frame image after the frame image is collected, performs recognition according to the uploaded frame image and returns the template image matching it, detects the marker area of the frame image according to the returned template image, further superposes the media data on the marker area, displays the superposed image, and uploads the frame image to a remote server to perform the recognition and matching with the template image, so that the relatively complex recognition process is not necessary to be completed locally, further largely improves the recognition ability in the interaction in augmented reality, and for all kinds of markers, it can all recognize template images matching them, which largely improves the flexibility.

It can be understood by those ordinary skilled in the art that the above all or part of the flows in the method examples can be realized by computer programs instructing corresponding hardware and the programs can be stored in computer readable storage media, and when the programs are executed, the flows in the above method examples can be included. The storage media can be a magnetic disc, a disc, a Read-Only Memory or a Random Access Memory, etc.

The foregoing description, for purpose of explanation, has been described with reference to specific examples. However, the illustrative discussions above are not intended to be exhaustive or to limit the present disclosure to the precise forms disclosed. Many modifications and variations are possible in view of the above teachings. The examples were chosen and described in order to best explain the principles of the present disclosure and its practical applications, to thereby enable others skilled in the art to best utilize the present disclosure and various examples with various modifications as are suited to the particular use contemplated.

What is claimed is:

1. A method for realizing interaction in augmented reality, comprising the following steps:
    collecting a frame image and uploads the frame image;
    recognizing a template image that matches the frame image and returning the template image;
    detecting a marker area of the frame image according to the template image; and
    superposing media data corresponding to the template image on the marker area and displaying the superposed image;
    wherein the step of detecting the marker area of the frame image according to the template image comprises:
    obtaining feature points in the frame image according to training data corresponding to the template image; and obtaining a contour location of the marker area in the frame image according to the feature points; and wherein before the step of detecting the marker area of the frame image according to the template image, the method further comprises;

detecting the stored template image to obtain the feature points and determining whether the number of the feature points is smaller than a threshold, and if it is not, then obtaining a sample image corresponding to the template image, and detecting feature points in the sample image; and processing the feature points in the template image and in the sample image to generate the training data recording the feature points.

2. The method for realizing interaction in augmented reality according to claim 1, wherein recognizing the template image that matches the frame image and returning the template image comprises:

obtaining property information of the uploaded frame image;

defining a matching scope in stored template images according to the property information; and searching the template image in the matching scope and determining whether the frame image matches the searched template image, and if it does, then returning the searched template image.

3. The method for realizing interaction in augmented reality according to claim 1, wherein before the step of detecting the marker area of the frame image according to the template image, the method further comprises:

determining whether the training data and media data corresponding to the template image exists in a local file, and if it does not, then downloading the training data and the media data, and if it does, then loading the training data and the media data.

4. The method for realizing interaction in augmented reality according to claim 1, wherein the step of processing the feature points in the template image and in the sample image to generate the training data recording the feature points comprises:

combining or clipping feature points in the template image and in the sample image to form the training data recording the feature points.

5. The method for realizing interaction in augmented reality according to claim 4, wherein before the step of combining or clipping the feature points in the template image and in the sample image to form the training data recording the feature points, the method further comprises:

adding random noises and performing obfuscation for the template image and the sample image, performing feature point detection again for the images added with the random noises and the obfuscation, to obtain corresponding feature points;

determining whether the feature points of the template image and the sample image exist in the feature points corresponding to the images added with the random noises and the obfuscation, and if they do, then clipping the feature points of the template image and the sample image, or otherwise, combining the feature points of the template image and the sample image.

6. The method for realizing interaction in augmented reality according to claim 5, wherein before the step of clipping the feature points of the template image and the sample image, the method comprises:

determining whether the number of reproduction times of the feature points of the template image and the sample image is larger than a reproduction threshold, and if it does not, then excluding the feature point, and if it does, then entering the step of clipping the feature points of the template image and the sample image.

7. The method for realizing interaction in augmented reality according to claim 1, wherein before the step of detecting the stored template image to obtain the feature points the method further comprises:

selecting a template image and corresponding media data; and determining whether the selected template image and the corresponding media data are to share according to the upload operation of a logon user, and if they are, then uploading and storing the selected template image and the corresponding media data to a public storage space, and if they are not, then uploading and storing the selected template image and the corresponding media data to a storage space corresponding to the logon user.

8. The method for realizing interaction in augmented reality according to claim 7, wherein the priority of the storage space corresponding to the logon user is higher than the priority of the public storage space.

9. The method for realizing interaction in augmented reality according to claim 1, wherein the step of displaying the superposed image comprises:

constituting a virtual environment by playing the media data and constituting a real environment by using the frame image with the marker area being removed.

10. A system for realizing interaction in augmented reality, comprising a client and a server; wherein the client comprises a collection module, a detection module and a display processing module;

the collection module is adapted to collect a frame image and uploads the frame image;

the server is adapted to recognize a template image that matches the frame image and return the template image;

the detection module is adapted to detect a marker area of the frame image according to the template image; and the display module is adapted to superpose media data corresponding to the template image on the marker area and display the superposed image;

wherein the detection module comprises:

a feature detection unit, to obtain feature points in the frame image according to training data corresponding to the template image; and a contour obtaining unit, to obtain a contour location of the marker area in the frame image according to the feature points; and wherein the server comprises:

a feature processing module, to detect the stored template image to obtain the feature points and determine whether the number of feature points is smaller than a threshold, and if it is not, then obtain a sample image corresponding to the template image and detect feature points in the sample image; and a training data generation module, to process the feature points in the template image and in the sample image to generate the training data recording the feature points.

11. The system for realizing interaction in augmented reality according to claim 10, wherein the server comprises:

a property obtaining module, to obtain property information of the uploaded frame image;

a scope defining module, to define a matching scope in stored template images according to the property information; and a search module, to search the template image in the matching scope and determine whether the frame image matches the searched template image, and if it does, then return the template image to the client.

12. The system for realizing interaction in augmented reality according to claim 10, wherein the client further comprises:
a data obtaining module, to determine whether the training data and media data corresponding to the template image exists in a local file, and if it does not, then download the training data and media data, and if it does, then load the training data and the media data.

13. The system for realizing interaction in augmented reality according to claim 10, wherein the training data generation module is further adapted to combine or clip feature points in the template image and in the sample image to form the training data recording the feature points.

14. The system for realizing interaction in augmented reality according to claim 13, wherein the training data generation module is further adapted to add random noises and perform obfuscation for the template image and the sample image, perform feature point detection again for the images added with the random noises and the obfuscation to obtain corresponding feature points, determining whether the feature points of the template image and the sample image exist in the feature points corresponding to the images added with the random noises and the obfuscation, and if they do, then clip the feature points of the template image and the sample image, and if they do not, then combine the feature points of the template image and the sample image.

15. The system for realizing interaction in augmented reality according to claim 14, wherein the training data generation module is further adapted to determine whether the number of reproduction times of the feature points of the template image and the sample image is larger than a reproduction threshold, and if it does not, then exclude the feature point, and if it does, then clip the feature points of the template image and the sample image.

16. The system for realizing interaction in augmented reality according to claim 10, wherein the client is also adapted to select the template image and corresponding media data;
the server is also adapted to determine whether the selected template image and the corresponding media data are to share according to the upload operation of a logon user, and if they are, then upload and store the selected template image and the corresponding media data to a public storage space, and if they are not, then upload and store the selected template image and the corresponding media data to a storage space corresponding to the logon user.

17. The system for realizing interaction in augmented reality according to claim 16, wherein the priority of the storage space corresponding to the logon user is higher than the priority of the public storage space.

* * * * *